Patented Feb. 5, 1929.

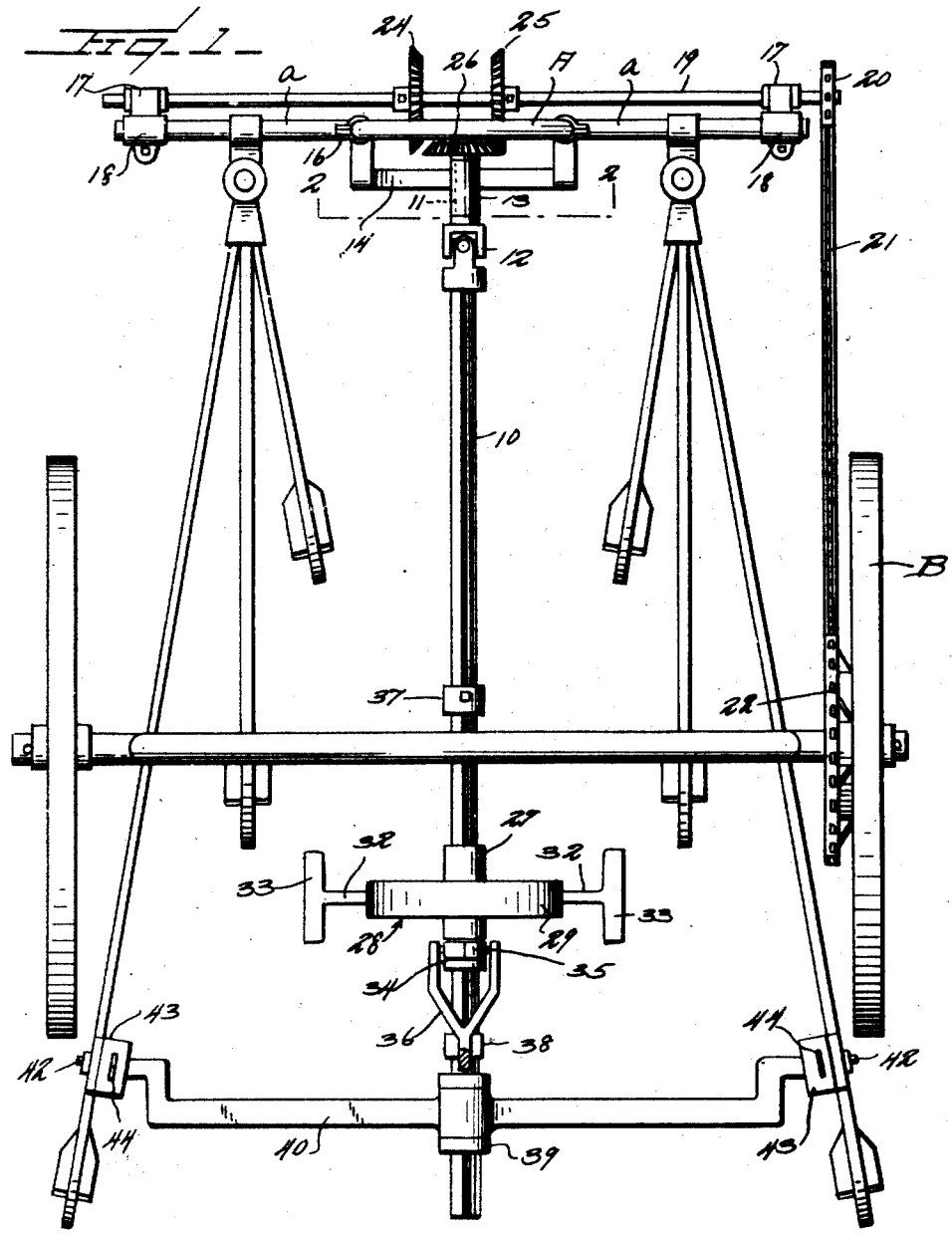

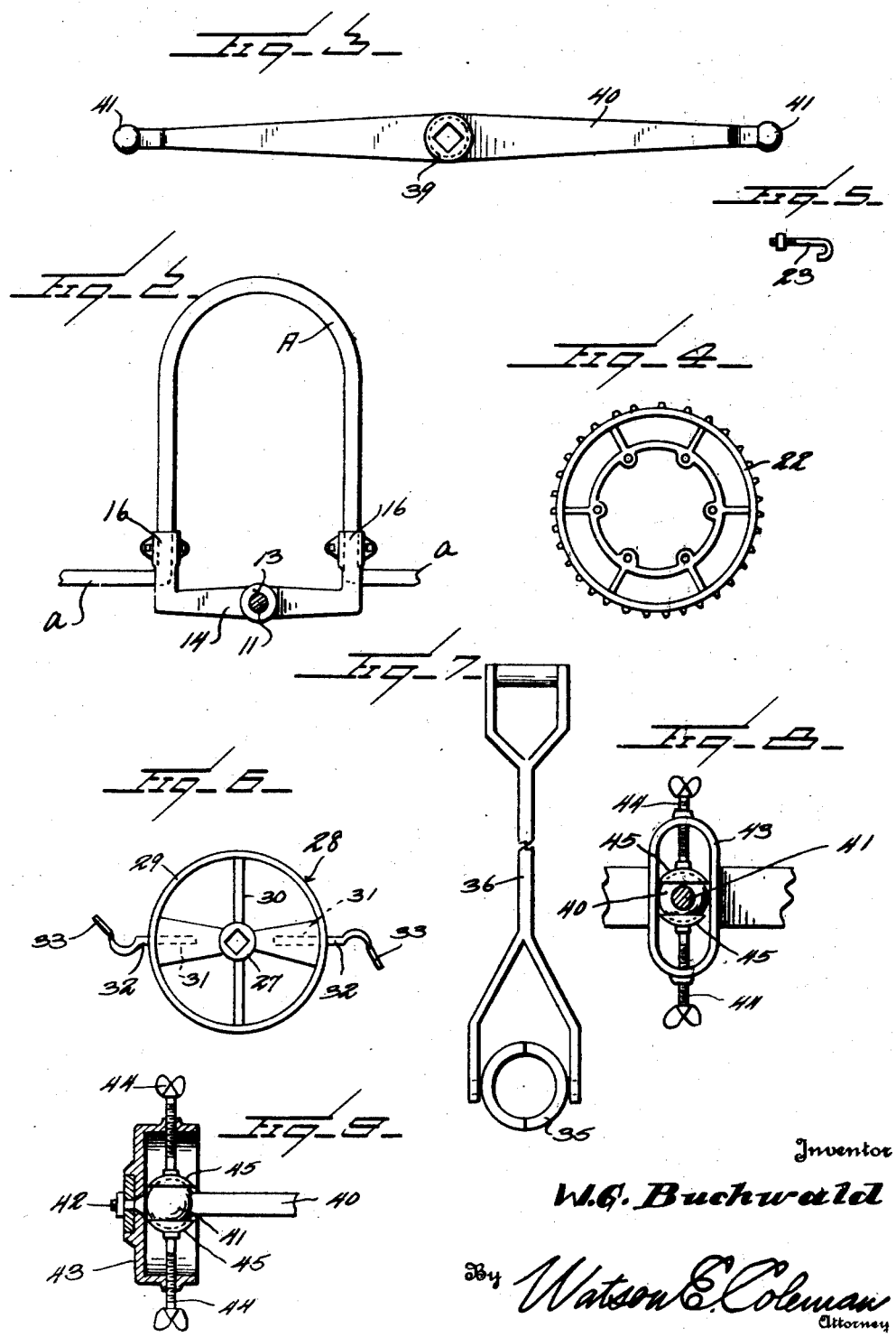

1,701,137

UNITED STATES PATENT OFFICE.

WILLIAM G. BUCHWALD, OF LAWTON, OKLAHOMA.

COTTON-CHOPPER ATTACHMENT FOR CULTIVATORS.

Application filed May 19, 1928. Serial No. 279,055.

This invention relates to cotton choppers, and particularly to an attachment designed to be mounted upon a cultivator and operated by the wheels of the cultivator, the attachment being readily removable when desired and the cultivator with the attachment acting not only to chop the cotton but also cultivate between the cotton rows.

The general object of the invention is to provide an attachment of this character which will enable the cultivator to be used as a cotton chopper and which may be readily applied to standard makes of cultivator, particularly the John Deere cultivator.

A further object is to provide a device of this character in which the chopping is done by rotatable blades mounted upon a longitudinal shaft, the blades being longitudinally shiftable upon the shaft by hand in order that the operator may contral the position of the blades, if desired, and leave cotton when necessary which would otherwise be chopped down.

A still further object is to provide a device of this character wherein the rear of the cotton chopper supporting shaft is adjustably mounted upon the cultivator beams so that as the beams are lowered the cotton chopper will be lowered into working position and as the beams are raised the chopper will be raised, the adjustment permitting the cotton chopper to be adjusted to chop less deep or deeper as desired.

Other objects will appear in the course of the following description.

My invention is illustrated in the accompanying drawings, wherein:—

Figure 1 is a top plan view of a cultivator with my cotton chopping attachment applied thereto;

Figure 2 is a section on the line 2—2 of Figure 1;

Figure 3 is an elevation of the rear transverse brace or support;

Figure 4 is an elevation of the sprocket wheel attached to one of the cultivator wheels;

Figure 5 is a view of one of the hooks therefor;

Figure 6 is a side elevation of the cotton chopping wheel;

Figure 7 is a top plan view of the means for shifting the cotton chopper;

Figure 8 is an elevation of a portion of one of the lateral beams showing the means of connecting the rear brace thereto;

Figure 9 is a vertical sectional view through the means shown in Figure 8.

Referring to these drawings, it will be seen that my attachment comprises a longitudinally extending shaft 10 which is formed in two sections, a relatively long rear section and a relatively short front section, designated 11, there being a swivel 12 connecting these sections. The shaft section 11 is mounted in a bearing 13 carried by a yoke or bracket 14. This bracket is forwardly extended at its ends to provide clamps 16 which engage with the forward arch A of the cultivator.

The laterally extending horizontal portions $a$ of this arch carry double brackets 17 which are formed to provide a clamp 18 engageable with the arm $a$ and a bearing for a transverse shaft 19. This transverse shaft at one end or at both ends, but preferably at one end, is provided with a sprocket wheel 20 over which passes a sprocket chain 21. This sprocket chain passes to a sprocket wheel 22 which is detachably mounted upon one of the rear wheels B of the cultivator to rotate therewith. This may be mounted on the wheel in any suitable manner as, for instance, by providing hook-shaped bolts or equivalent members 23 on the wheel 22 engageable with the spokes of the wheel B. Any suitable construction of this character may be provided. This sprocket wheel 22 is, of course, considerably smaller in diameter than the cultivator wheel B.

The shaft 19 carries upon it the two beveled gear wheels 24 and 25, one of which engages with a beveled gear wheel 26 which is mounted upon the shaft section 11 and causes the rotation of the latter. The beveled gears 24 and 25 may be mounted for sliding movement upon the shaft 19 and held in place with either one of the gear wheels engaged with the gear wheel 26 in any suitable manner or only one beveled gear wheel, as, for instance, the beveled gear wheel 25, may be mounted upon the shaft 19 to engage the beveled gear wheel 26. By providing two beveled gear wheels 24 and 25 and providing means whereby they may be shifted to bring either one into engagement with the gear wheel 26, the shaft 10 may be rotated either in a clockwise or counterclockwise direction.

Mounted for rotation upon the shaft 10 as, for instance, being splined thereon is the hub 27 of the cotton chopper, designated generally 28. This chopper, as shown in Figure 6, is formed of a disk 29 having spokes 30, certain of these spokes being enlarged toward the periphery of the wheel and formed with sockets 31. Extending into each socket is the shank 32 of the cotton chopping blade 33. This blade 33 is approximately 9″ in length and extends parallel to the shaft 10.

It will be obvious that as the shaft 10 is rotated, the cotton chopper will be rotated and these blades 33 will cut out the cotton as the machine moves along over the ground. The hub 27 of the cotton chopper is slidably mounted upon the shaft 10, and to this end one end of the hub is formed with a circumferential groove 34 fitted with an annular yoke 35 from which extends a handle 36. This handle is flexibly connected to the yoke 35 so that the extremity of the handle may be disposed convenient to the driver's hand as he sits upon the cultivator.

By this means the cotton chopper may be shifted longitudinally along the shaft from an extreme forward position to an extreme rearward position. Stop collars 37 and 38 are provided which are adjustable along the shaft by means of set screws and which limit the forward or rearward movement of the cotton chopper. The rear end of the shaft 10 is supported in a bearing 39 carried by a transversely extending supporting bar 40, the extremities of which are provided with the balls 41.

Mounted upon the lateral plow beams by means of the bolts 42 are vertically disposed, somewhat elliptical members 43 having screws 44 passing through their upper and lower ends and provided each at its inner end with a depressed seat 45 for the ball to rest in. The member 40, it will be seen, is deflected at its ends. These members 43 are attached to the cultivator beams of the machine so that, as the beams are raised and lowered, the rear end of the shaft 10 will be raised or lowered, and thus when the cultivator teeth on the beams are brought into action the cotton chopper will be brought into action. This supporting member 40 is fastened on the two outside plow beams so that the two inside beams are shorter.

The use of this attachment will be obvious from what has gone before. The cotton will be chopped and cultivated at the same time. As the cultivator moves over the rows, the rotating chopper will cut out the cotton at intervals, and if the operator needs to save a stalk that may not have others around it or sufficiently near to it, he can readily shift the chopper 28 forward or rearward so as to save this stalk. This attachment, as before stated, may be applied to certain standard types of cultivators, though, of course, it might be incorporated initially in a cultivator. By adjusting the screws 44, the rear end of the chopper may be raised or lowered so as to chop deeper or shallower. The chopping knives may be readily removed and new ones put in place at any time, the shanks of these knives being held in place by set screws in their respective sockets.

I claim:—

1. A cotton chopping attachment of the character described comprising a longitudinally extending shaft formed in two flexibly connected sections, a bracket having a bearing supporting the forward section, the bracket at its ends extending forward and providing a bearing for a transverse shaft, intermeshing gear wheels on the forward section of the first named shaft and on said second named shaft, a sprocket wheel mounted upon the second named shaft, bearings on the second named shaft adapted to engage the arch of the cultivator, means whereby the sprocket wheel may be driven from one of the wheels of the cultivator, a transversely extending support for the rear end of said first named shaft having balls at its ends, vertical members adapted to be attached to the lateral plow beams of the cultivator and having vertically disposed, opposed screws with concave seats adapted to engage said balls whereby the supporting bar may be raised or lowered, a cotton chopper rotatably and slidably mounted upon the first named shaft and rotating therewith and having cutting blades extending approximately parallel to the shaft, and manually operable means for longitudinally shifting said cotton chopper.

2. In a cotton chopper, a supporting frame, a longitudinally extending shaft movable in a vertical plane, a cotton chopper mounted for rotation upon and with the shaft, means for driving the shaft, plow beams mounted upon the frame for vertical movement and for transverse swinging movement, a transversely extending support for the rear end of the shaft, and means connecting the transverse support to the plow beams and permitting the supporting bar to be vertically adjusted relative to the plow beams.

In testimony whereof I hereunto affix my signature.

WILLIAM G. BUCHWALD.